Figure 1:
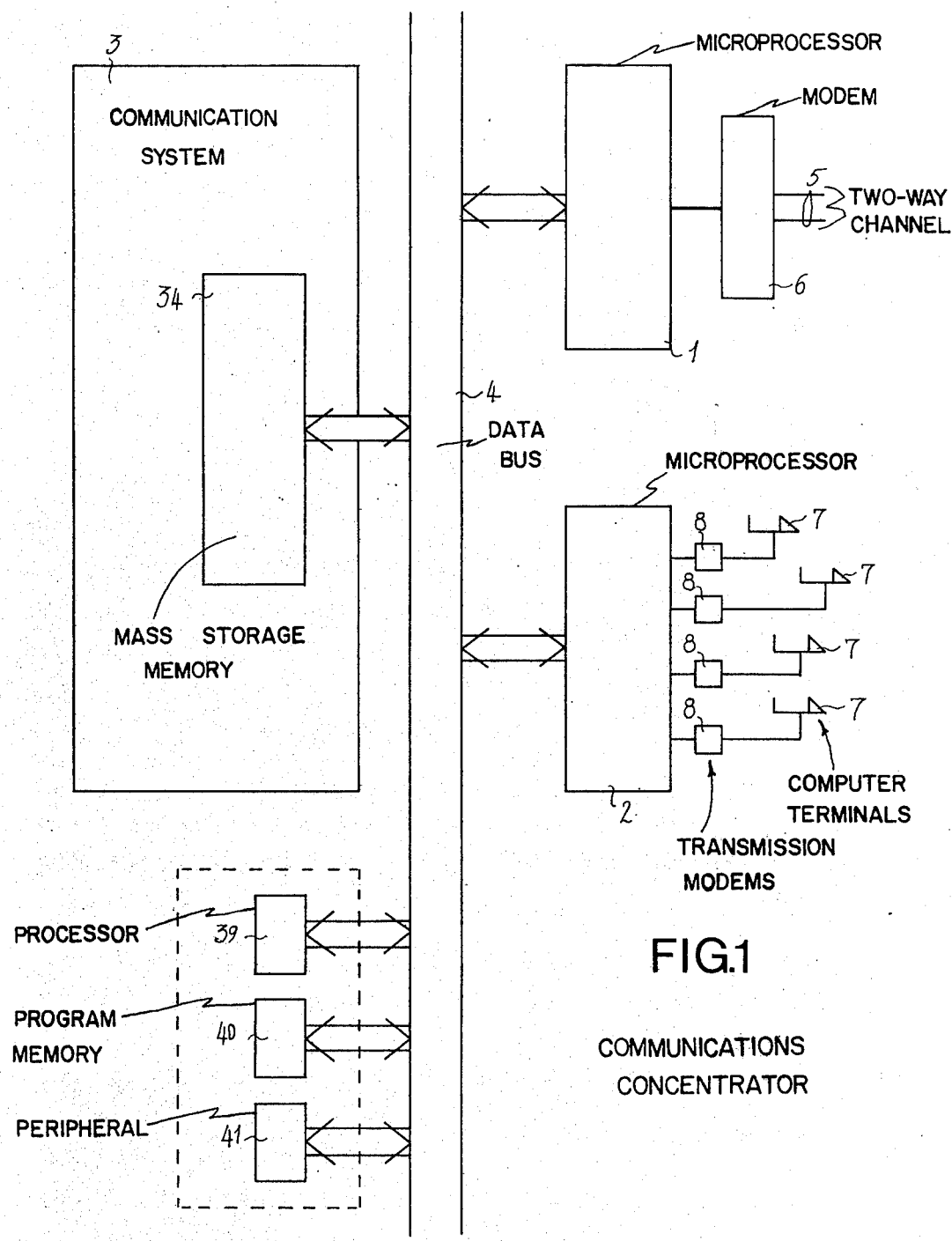

United States Patent [19]

Bordry et al.

[11] 4,354,263

[45] Oct. 12, 1982

[54] COMPUTER-COMMUNICATIONS CONCENTRATOR FOR TRANSMISSION AND SWITCHING OF PACKETIZED DATA

[76] Inventors: Hervé Bordry, 15, rue Jean Richepin; Hervé Layec, 50 rue Papu, both of 35000 Rennes; Jean-Claude L'Hostis, L'Erable, 35230 Saint-Herblon, all of France

[21] Appl. No.: 158,568

[22] Filed: Jun. 11, 1980

[30] Foreign Application Priority Data

Jun. 13, 1979 [FR] France .................................. 79 15742

[51] Int. Cl.³ ......................... H04J 3/00; H04Q 11/04
[52] U.S. Cl. ........................................ 370/94; 370/60
[58] Field of Search ...................... 370/60, 94, 41, 43, 370/58, 91

[56] References Cited

U.S. PATENT DOCUMENTS 3,766,322 10/1973 Moffett et al.
4,156,798 5/1979 Doelz ..................................... 370/94
4,271,507 6/1981 Gable et al. ........................... 370/94

FOREIGN PATENT DOCUMENTS 2310051 11/1976 France.
2331221 3/1977 France.

OTHER PUBLICATIONS

"Interface Standards for Public Data Networks", by Folts, *Computer Communications Networks*, 1978, pp. 246-252.
"Some Design Aspects of a Public Packet Switched Network", by Nakamura et al., Nippon Tel. and Tel., Toronto, Aug. 1976, pp. 317-322.
"Telecommunications Networks for EURONET", by Kelly and Lee, *The Post Office Electrical Engineer*, Jan. 1978, pp. 208-216.

*Primary Examiner*—Thomas A. Robinson
*Attorney, Agent, or Firm*—Laff, Whitesel, Conte & Saret

[57] ABSTRACT

A computer-communications concentrator for establishing connections between a plurality of asynchronous computer-communications terminals and a two-way computer-communications channel for transmission and switching of packetized data. The concentrator is comprised of one processing unit which is operated asynchronously and is connected to the computer-communications terminals. One X25 interface normalizing function processing unit is connected to the two-way computer-communication channel, with, between the two processing units, a communication system comprised of one memory unit having a first part in which each packet transmitted in one or the other direction is stored, and a second part comprised of forward and return cell pairs. Each cell is provided to store a packet header during a transfer into the communication system, each local header containing the address of the packet stored in the first part of the memory unit, its length, and some data relevant to the type of packet, the interpretation of which is used to determine in the processing unit which reads it, the appropriate processing to be done for the packet at hand. Each link between a terminal and the two-way channel makes use of a couple of selected pairs of cells, each packet being stored in a location available from the first part of the processing unit which introduces this packet into the memory inserting a local header in the corresponding outgoing cell from the associated cell pair, then transferring this local header into the return cell of the other pair from the set associated with the unit which will output the packet from the memory unit when this cell is available as indicated by a particular value of the packet type information.

3 Claims, 5 Drawing Figures

COMPUTER-COMMUNICATIONS CONCENTRATOR FOR TRANSMISSION AND SWITCHING OF PACKETIZED DATA

This invention relates to a computer-communications concentrator which permits the connection between, on one hand, a multiplicity of asynchronous computer communications terminals and on the other hand, a two-way computer communication channel for transmission and switching of packetized data.

In the description that follows, we shall refer in particular to the case in which the data packet switching and transmission network is the French public network "Transpac" which is specifically described in the French Journal "Telecommunications", No. 30, January 1979, pages 31 to 37 and in a brochure "Transpac" edited in September 1976. In other respects, it will be assumed that the interface between the computer-communications concentrator and the computer-communications channel of the network conforms with temporary Notice X25 issued by the CCITT for data transmission utilities employing data packet switching. It will also be assumed that the computer-communications terminals connected to the concentrator are asynchronous terminals whose interfaces are in agreement with the series V Notices issued by the CCITT. However, it should be understood that the computer-communications concentrator in accordance with this invention can be used with other packet switching networks and other types of terminals.

A computer-communications concentrator of this type has been previously described as a contribution in the "Euromicro" conferences held in Amsterdam, Netherlands, in October, 1977 titled "Microprocessors and Packet Switching Networks", by H. Layec and J. C. L'Hostis. In this concentrator, an assembly and disassembly program is provided which allows on one hand, the construction of packets with the characters output by an asynchronous terminal and vice versa, and, on the other hand, the interpretation of signalling communications. It will be recalled that, from the signalling data, it is possible to establish or to cut communications as well as to modify certain parameters related to the terminal, the echo, the length of the line link, the parity, etc. In fact, this known concentrator had limited performance because it used an HDLC (High Level Data Link Control ISO 3309) in a programmed mode frequently requiring usage of the microprocessor. The number of asynchronous terminals served was limited because of the availability of a single microprocessor resource for the whole concentrator. The number of LSI (Large Scale Integration) circuits used in the coupler being small, the per unit cost is important.

One object of the present invention of providing a computer-communications concentrator which, with respect to the above-mentioned concentrator offers a lower per unit cost with increased flexibility and performance.

In accordance with a feature of the present invention, a computer-communications concentrator is provided for establishing connections between a multiplicity of asynchronous computer communications terminals and a two-way computer-communication channel from a data packet switching and transmission network. One processing unit operates asynchronously and is connected to the computer-communication terminals. One X25 normalizing function processing unit is connected to the two-way computer-communication channel. Between the two processing units, a communication system is comprised of one memory unit having a first part in which each packet transmitted in one or the other direction is stored. A second part is comprised of forward and return cell pairs. Each cell is provided to store a packet header during a transfer into the communication system. Each local header contains the address of the packet stored in the first part of the memory unit, its length, and some data relevant to the type of packet. The interpretation of the packet of data is used to determine the processing unit which reads it and the appropriate processing to be done for the packet at hand. Each link between a terminal and the two-way channel makes use of a couple of selected pairs of cells. Each packet is stored in a location which is available from the first part of the processing unit and which introduces this packet into the memory, by inserting a local header in the corresponding outgoing cell from the associated cell pair. Then this local header is transferred into the return cell of the other pair, from the set associated with the unit which will output the packet from the memory unit when this cell is available, as is indicated by a particular value of the packet type information.

In accordance with another feature, the memory unit has a third part in which are written the set identities of cells used, each set indicating a communication between two pairs of cells, this third part acting as a communications matrix.

In accordance with another feature, each processing unit is a microcomputer having a microprocessor capable of sending either to the computer-communication terminals or to the two-way channel, normalized messages or packets or vice versa of receiving them, each microprocessor being capable of writing or reading into the memory unit with a procedure that avoids overwrites.

Figure 2:
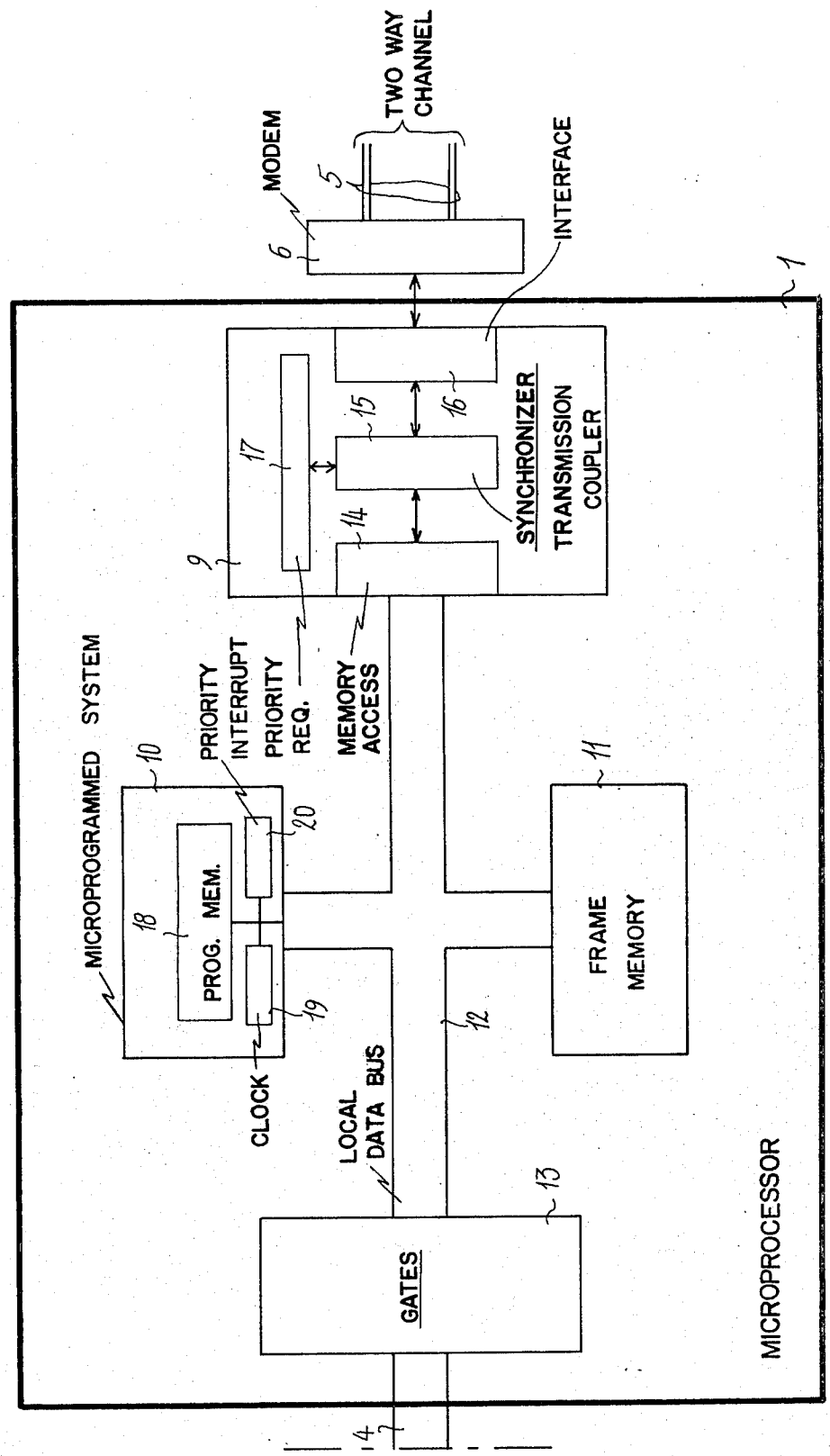
Figure 3:
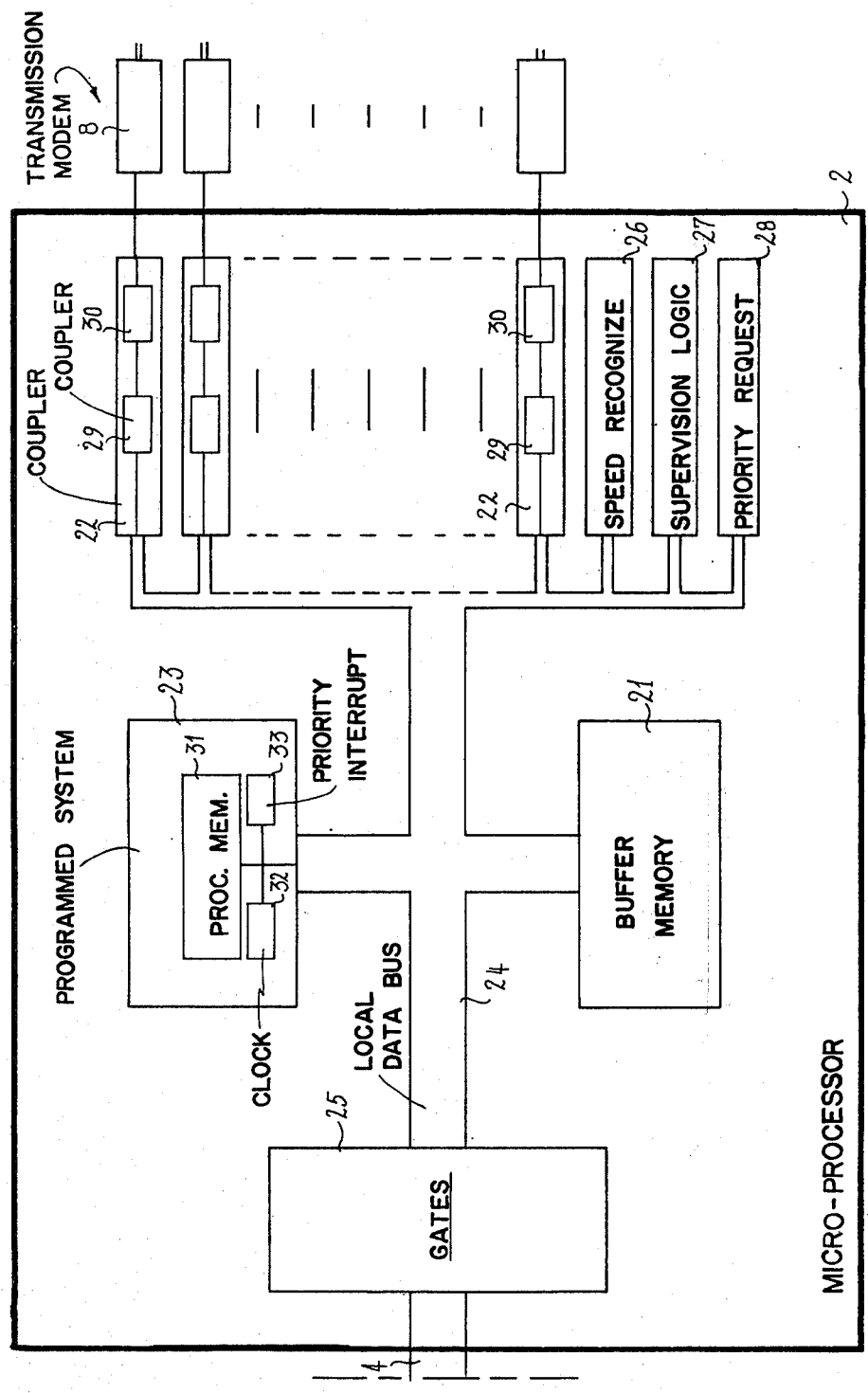
Figure 4:
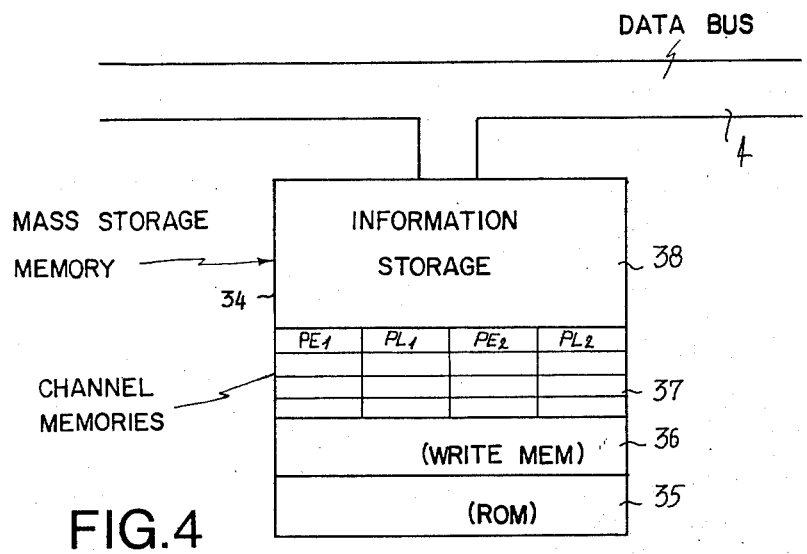
Figure 5:
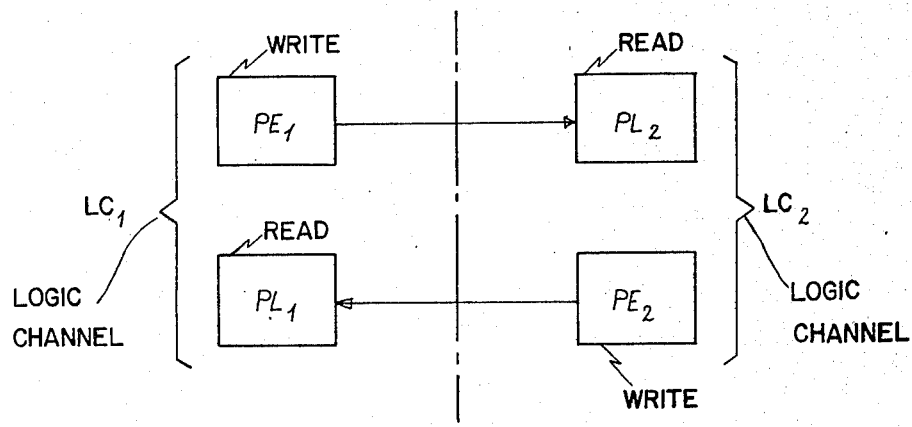

The characteristics of the present invention mentioned earlier, as well as others, will become more clear upon reading the following description of an embodiment, the said description being made with respect to the attached figures, in which:

FIG. 1 is a general block diagram of a computer-communications concentrator in accordance with the invention, FIG. 2 is a more detailed block diagram of the concentrator interface with respect to a two-way computer-communications channel from a packet switching network, FIG. 3 is a more detailed block diagram of the concentrator interface with respect to the asynchronous computer-communications terminals, FIG. 4 is a block diagram of the communication system between the interfaces of FIGS. 2 and 3, and FIG. 5 is a schematic illustrating the dialogue between the inputs and outputs of the communication system of FIG. 4.

According to the schematic of FIG. 1, the concentrator includes a microcomputer 1 which carries out what is referred to below as "Function X25", that is, it carries out the procedure as it is described in Notice X25 of the CCITT as mentioned above, a microcomputer 2 which carries out what we call the "Asynchronous Function", that is, it is in charge of the management of the asynchronous terminals and of the analysis of commands coming from the terminals, and a communication system 3 which allows microcomputers 1 and 2 to exchange information. Between elements 1, 2 and 3 there is provided a data bus 4.

The microcomputer 1 is connected to the two-way computer-communications channel 5 from a packet switching network, which is assumed below to be a Transpac network as defined above, by a modem 6 in accordance with Notices V28 or V35 of the CCITT. The microcomputer 2 can be connected to the asynchronous computer-communications terminals 7 by asynchronous transmission modems 8, in accordance with series V notices of the CCITT.

The microcomputer 1 of FIG. 2 is comprised of an asynchronous transmission coupler 9 operating in an integral duplex mode, a micro-programmed system 10, a frame memory 11 and a local bus 12, with a connection system between bus 12 and bus 4. The coupler 9 is comprised of apparatus for direct access to memory 14, synchronization apparatus 15, an interface 16 towards modem 6, and a priority request apparatus 17. The coupler 9 operates in accordance with the HDLC protocol or the high level chain command procedure defined by the International Standards Organization (ISO), in the documents with reference numbers as follows: IS3309, IS4335 and the approved modifications (TC97/SC6/N 1 300 and 1 445) and DP6256. The synchronization apparatus 15 is a well known HDLC box, which guarantees synchronization of channel 5 by carrying out the following operations: transmission and reception of flags, insertion and removal of zeros in the message, computation and control of the redundant and cyclic code Frame Check Sequence (FCS).

The micro-programmed system 10 is comprised of the processor program memory 18, a clock 19 and a priority request interrupt system 20. It carries out the X25 procedure. It should be understood that the program of system 10 is a familiar type of program already in use in packet switching networks; such as the Transpac network in France, the Datapac network in Canada, and the Telenet network in the United States. It therefore is unnecessary to describe such program in greater detail.

The frame memory 11 contains all the necessary parameters for the numbering and release of the frames. These parameters are updated upon transmission or reception of each frame. The memory 11 also contains a certain number of frames of fixed format: SARM, UA, DISC, etc., whose definitions are given in paragraph 2.3.4 of Notice X25 of the CCITT.

In microprocessor 1, the detection and recovering of errors is guaranteed by the micro-programmed system 10 which also guarantees the maintenance of order and density of the packets.

The micro-computer 2 of FIG. 3 is comprised of a buffer memory 21, asynchronous couplers 22, a programmed system 23 and a local bus with connection systems 25 between bus 24 and bus 4. In the example described, it was assumed that the micro-computer 2 has eight asynchronous couplers 22 each giving access to a terminal 7 by a modem 8.

The buffer memory 21 is comprised of two circular buffers by terminal 7.

The asynchronous couplers 22 have speed recognition logic 26 in common, a modem supervisory logic 27 and a priority request logic 28. Each coupler 22 is constituted by a conventional asynchronous integrated coupler 29 and electrical level conversion interface circuit 30.

The programmed system 23 is constituted by a processor program memory 31, a clock 32 and a priority interrupt request system 33. With a frequency that depends on the speeds of the terminals, the clock 32 induces an interrupt towards processor 31 which reads the character then present in the associated coupler 29 and stores it in the corresponding circular buffer. In recording, the processor 31 analyses all the characters stored in the two-circular-buffer memory 21 to determine the order of arrival from the terminal and the corresponding packets for destination by communication 3, this in the direction of receiving data from the terminal. In the direction of transmission to the terminal, the packets received from the communication system 3 are analyzed and their contents stored in the corresponding transmission circular buffer.

The connection system 12–25 between the local bus and the bus 4 is one of the many well known link modules which enable the hook-up of a number of microcomputers to a common memory through a proper management of priority requests. For the purpose of illustration, a module of this type could be the commercial modules Nos. 8218/8219 offered by the American Company Intel Corporation under the name "Bipolar Microcomputer Bus Controller MCS-80 and MCS-85 Families".

The communication system 3 consists essentially of one mass storage memory 34.

In memory 34, (FIG. 4), we can identify a first zone 35 which is the read only memory which contains a number NUMRES and a logic channel identification table, a second zone 36 which is an active memory in which is written the system connection matrix, a third zone 37 which is an active memory made up of as many pairs of cells as logic channels, each cell being foreseen to store a header, and a fourth zone 38 which is provided to store the information part of the packets.

The bus 4 establishes the connection between the microprocessors 1 and 2 and the memory 34. It is comprised of the following lines:
data lines forming the data bus,
address lines forming the address bus, which is used to address memory 34, it has 16 lines,
multiprocessors 1 and 2 control lines.

In fact since memory 34 and bus 4 may be requested simultaneously by the microprocessors 1 and 2, the access conflicts are resolved by a serial priority system, a bus clock being used to analyze all the requests at the same time.

The necessary multiprocessor control signals are:
BUS CLOCK
BUS DEMAND
BUS BUSY
BUS FREE for data INPUT
BUS FREE for data OUTPUT.

With the clock operating, for example at 10 Mhz and a conventional mass storage memory of the MOS type with a 400 nanosecond access time, the throughput of the communication system 3 is approximately 8 Mb/s, the access conflicts being resolved.

The previous description of the bus 4 demonstrates that it is a conventional computer bus from which are removed the peripheral READ and peripheral WRITE control lines.

Each Function X25 1 or Asynchronous Function 2 microcomputer is, during a communication, seen by the communication system 3 through the cells of zone 37 of memory 34.

A communication, also called a "virtual circuit", is an association between two logic channels, that is between two pairs of cells 37, with one logic channel for microcomputer 1 and the other logic channel for microcomputer 2. There are of course as many logic channels LC which can be associated with 2, as there are terminals served by 2.

In a virtual circuit, the exchange of information is possible between the two logic channels in the two directions of transmission with a flow in relation to the information density to be processed. The communication can be freed at any time.

The exchange of information is carried out in the form of packets that have the following make-up:
  a block of information which contains a maximum of 32 octets in the chosen example.
  a header which contains
    the address of the information block (2 octets)
    the useful length of the information block (1 octet)
    the type of packet (1 octet)
that is, a header totalling four octets.
For example, the possible types of packet are:
  0: packet non-existent
  1: data packet
  2: virtual circuit opening request packet
  3: virtual circuit opening confirmation packet
  4: virtual circuit closing or release request packet
  5: virtual circuit closure confirmation packet.

FIG. 5 illustrates the dialogue between two logic channels LC1 and LC2, one corresponding to the set of gates 13 and the other to the set of gates 25. Each logical channel LC1 or LC2 has permanent access to two cells, one PE1 or PE2 for writing and the other PL1 or PL2 for reading. The corresponding microcomputer 1 or 2 can write information into PE1 or PE2 and read information in PL1 or PL2.

The operation is as follows. We assume that microcomputer 1, in charge of managing LC1, has transmitted a packet to memory 34. In reality, the transmission from 1 to 34 consists of inducing the storage of the information block from the packet in a memory location in zone 38 or 34 and causing the storage into cell PE1, the header corresponding to the packet in this operation. We recall that this header has the address of the memory location where the information block and its length are stored, as well as a 1 indicating that the header is relevant to an existing data packet. When microcomputer 1 (FIG. 1) decides that it is useful to supply the packet to microcomputer 2, it reads, in cell PL2 (FIG. 5) the stored header-type octet. If the value of this octet is 0, the microcomputer 1 is caused to rewrite in cell PL2, the header stored in cell PE1. In fact, the 0 type octet indicates the absence of a packet. If the value of this type octet is 1, this indicates that microcomputer 2 in charge of managing PL2 is not finished processing the earlier transmitted packet. The microcomputer 1 can thus carry out another while checking from time to time the value of the type octet in PL2.

It is important that the rewriting of the header of PE1 into PE2 should terminate with the rewriting of the octet type so that the acquisition of the header stored in PL2 by the microcomputer 2 will bear the information such as the corresponding block address and length in zone 38 (FIG. 4).

In the opposite direction, from LC2 to LC1, the exchange of packets is done in the same fashion, by inverting the roles of the microcomputers.

Given the part played by the computer-communications concentrator, which is that of giving to the terminals that are attached to it access to the Transpac network or to a network of that type, or vice versa, the concentrator receives, like any apparatus hooked to the network, a network number NUMRES. Each terminal connected to this concentrator also receives its own proper number which is made up of the NUMRES of the concentrator plus a sub-number, in general of one or two digits. In the concentrator, it can be assumed that the sub-number 00 is reserved for computer communication channel 5 towards the Transpac networks.

In zone 35 of memory 34 is written the concentrator's configuration, that is:
  the concentrator's NUMRES number,
  a table identifying the logic channels assigned to the terminal lines and the logic channels assigned to the computer-communications channel 5, to the Transpac network.

In zone 36, is written the connection matrix which gives at all times, the correspondence between the logic channels LC which are communicating.

When the microcomputer 2 (FIG. 2), in charge of managing one logic channel LC2 corresponding to one terminal, wants to establish a communication requested by this one terminal with a correspondent with a NUMCO number, it creates a call packet by writing in the information block part the NUMCO number of the requested correspondent, followed by the number associated with the calling logic channel LC2 and in PE1 (FIG. 5) a header of type 2. Then, microcomputer 2 compares the NUMCO and NUMRES numbers. If the two numbers do not coincide, the correspondent called is alien to the terminals served by the concentrator. Then, the microcomputer 2 searches for a free logic channel LC1 amongst those used for computer-communications channel 5 (FIG. 1). If on the other hand all the binary digits that make up NUMRES are in the NUMCO number, the remaining portion of NUMCO, that is the subnumber, determines the logic channel LC1 assigned to the correspondent request, because it is a member of the terminals served by the concentrator.

Two cases can thus occur. First, the channel LC1 thus determined is free. Then the microcomputer writes in PL1 of that channel the header of PE2 from LC2 and carries out the marking of connection (LC2–LC1 in the connection matrix of zone 36. If no free logic channel LC1 can be found, either the channel to the terminal called is already connected, or all the channels assigned to line 5 are already connected. Then, the microcomputer 2 (FIG. 1) transmits to the calling terminal the "Busy" information "connection impossible".

In the case where a connection can be established, which indicates a look-up of the connection matrix, microcomputer 1 acknowledges, by reading the header contained in PL1 (FIG. 5), and by reading the relevant information block. It acknowledges the requested communication since that block contains the NUMCO number. It can thus accept communication by sending to microcomputer 2 (FIG. 1) by PE1 (FIG. 5) and PE2 a packet confirming the opening of the virtual circuit. This packet is referred to as "COM", and is featured by an octet of value "3" or again it can refuse communication by returning, in the same manner, a packet requesting closure of the virtual circuit. This packet is referred to as "LIB" has an octet of the value "4". In this last case, the microcomputer 2 transmits to the calling terminal the busy information "connection impossible"

and to microcomputer 1 the virtual circuit closure confirmation packet, called "CLIB" packet with an octet of a type value "5".

At the end of communications, the cutting of the virtual circuit established between the two logic channels LC1 and LC2 is carried out simply by the exchange of packets LIB and CLIB and is accompanied by the corresponding update in the connection matrix.

In the communication system 3 (FIG. 1) of the concentrator, the connection matrix of zone 36 (FIG. 4) is unique and only one of the two microcomputers can access it at a given time. Hence, we foresee the protection matrix protected by a mechanism of the well known "Test and Set" type.

Before giving an example of the timing diagram for a communication, we will describe the operation of the microcomputers Function X25 and Asynchronous Function.

Periodically, the microprogrammed system 10 (FIG. 2) tests the different PL cells by reading in each header its octet type value. If the value of an octet type is found to be different from zero, system 10 supplies to the direct access apparatus 14 the address and number of packets to transmit, the apparatus 14 being able to read directly in memory 34 (FIG. 5). It then gives the command "start transmission" to the HDLC synchronization apparatus 15. Transmission is thus caried out towards link 5 according to X25 procedure, which will not be described here.

When frame X25, corresponding to the relevant packet, has been completely transmitted, including the frame command sequence FCS, the HDLC synchronization apparatus 15 induces a priority request, through apparatus 17 towards the interrupt system 20 of the microprogrammed system 10 which eventually supplies a new frame to transmit.

In the receive direction, the microprogrammed system 10 supplies to the direct access apparatus 14, the write address in 34, with maximal length. When the reception of a frame is completed, including the frame control sequence FCS, the HDLC apparatus 15 addresses by priority request circuit 17 and system 20 a priority request to the microprogrammed system 10, i.e., the header octets of the received frame.

Independently of the transport of information, the microprogrammed system 10 is able to guarantee the supervision of modem 6 by acting on the interface circuit 16.

In the Asynchronous Function microcomputer, with a frequency that depends on the terminals' speed, the clock 32 (FIG. 3) induces an interrupt in the programmed system 23 which reads the character present in the asynchronous coupler 29 and stores it in the circular buffer of memory 21. In recording, the programmed system 23 analyzes all the characters admitted in memory 21 to generate the commands coming from the relevant terminal and the corresponding packets destined for communication system 3.

In the transmit direction toward the terminal, the received packets are analyzed and their contents are stored in the buffer memory 21, and in particular, in the transmission buffer of that memory.

In the above description, we have successively developed the operating principles of the communication system 3, then the principles of the Function X25 microcomputer, and finally the principles of the Asynchronous Function microcomputer 2.

For illustration purposes, we will now describe the normal flow of signals exchanged through the concentrator during a communication.

As soon as a call appears on an asynchronous line connected to a modem 8 (FIG. 3), the supervisory logic of modem 27 detects the appearance of a carrier and, through the priority request logic 28, induces the transmission of an interrupt towards the interrupt system 33 of the programmed system 23 to request a claim for the speed recognition logic 26 for the calling terminal. The speed recognition logic 26 determines the time between two descending edges on a specified character, normally the character V, and can thus recognize the speed in eight steps between 110 and 9600 binary bits per second.

As soon as the speed has been determined, the speed recognition logic 26 transmits to the programmed system 23 a signal "end of speed recognition". This signal means that the "speed recognition" logic circuit 26, only for asynchronous couplers 22, can be used for another terminal. The programmed system 23, causes the transmission to the calling terminal of a call receive acknowledgement, for example "Hello Line Active". Otherwise, the system 23 will "scan" this terminal at the clock's request and in hold.

The calling terminal transmits the NUMCO number called, which triggers, as seen above the forwarding of a packet of type 2 to the X25 microcomputer, which, as is assumed accepts communication and returns to the Asynchronous Function microcomputer a COM packet of type 3. These packet exchanges are done through the communication system 3 (FIG. 1).

The Function X25 microcomputer transmits by modem 6 and link 5 a call packet through the Transpac network to the called party.

Later, the called party replies by sending a message which is received by microprocessor 1 which retransmits it to microprocessor 2 by way of communication system 3 and microprocessor 2 sends it to the calling terminal. The packet crossing communication system 3 is thus a packet of type 1.

Communication is thus established and packets of type 1 are exchanged in both directions in full complex.

At the end of a communication, we assume that the calling terminal breaks the communication and to do this transmits a disconnect message which is translated through communication 3 by a message of type 4 (CLIB).

The Function X25 microcomputer returns to microprocessor 2 a packet of type 5 (CLIB), and in other respects, through the Transpac network transmits the disconnect message to the called party.

In practice, the disconnect message from the terminal to microprocessor 2 can be the disappearance of the carrier which ends the scanning of this terminal by program system 23 (FIG. 3).

In another variation, we substitute for the speed recognition logic 26 a set of fixed connections to give a fixed speed to each of the synchronous channels.

In FIG. 1, there is represented by 39, 40 and 41 a processor, a program memory and a peripheral which have access to bus 4 and to which can be associated in memory 34 logic channels allowing them to communicate with the terminals or with the Transpac network.

The embodiments of the invention in which an exclusive property or privilege is claimed are defined as follows:

1. A computer-communications concentrator for establishing connections between a multiplicity of asynchronous computer-communications terminals and a two-way computer-communication channel from a data packet switching and transmission network, comprised of one processing unit means operating asynchronously and being connected to the computer-communication terminals, one X25 normalized function processing unit means connected to the two-way computer-communication channel, said concentrator being characterized in that between the two processing units means, a communication system comprised of one memory unit means having a first part for storing each packet transmitted in one or the other direction, a second part comprised of forward and return cell pairs, each cell being provided with means to store a packet header during a transfer into the communication system, each local header containing the address of the packet stored in the first part of the memory unit means, its length, and the type of packet stored there, the interpretation of the stored packet being used to determine in the processing unit which reads it, the appropriate processing to be done for the packet at hand, each link between a terminal and the two-way channel making use of a set of selected pairs of cells, each packet being stored in a location which is available from the first part of the processing unit which introduces this packet into the memory, inserting a local header in the corresponding outgoing cell from the associated cell pair, and transferring this header into the return cell of the other pair from the set associated with the unit which will output the packet from the memory unit when this cell is available, as indicated by the packet information.

2. A computer-communications concentrator in accordance with claim 1, characterized in that the memory unit means has a third part in which are written the set identities of cells used, each set indicating a communication between two pairs of cells, the third part acting as a communications matrix.

3. A computer-communications concentrator in accordance with claim 2, featured in that each processing unit is a microcomputer having a microprocessor capable of sending either to the computer-communication terminals or to the two-way channel, normalized messages or packets or vice versa of receiving them, each microprocessor being capable of writing or reading into the memory unit with a procedure which avoids overwrites.

* * * * *